United States Patent
Rivera (10) Patent No.: US 11,666,002 B2
(45) Date of Patent: Jun. 6, 2023

(54) ELECTRICALLY DRIVEN AGRICULTURAL BALER

(71) Applicant: CNH Industrial America LLC, New Holland, PA (US)

(72) Inventor: Francisco Rivera, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 677 days.

(21) Appl. No.: 16/715,091

(22) Filed: Dec. 16, 2019

(65) Prior Publication Data

US 2021/0176922 A1 Jun. 17, 2021

(51) Int. Cl.
*A01F 15/07* (2006.01)
*A01F 15/08* (2006.01)
*A01F 15/10* (2006.01)
*A01B 69/00* (2006.01)

(52) U.S. Cl.
CPC ........ *A01F 15/0841* (2013.01); *A01B 69/004* (2013.01); *A01F 15/07* (2013.01); *A01F 15/085* (2013.01); *A01F 15/10* (2013.01); *A01F 2015/077* (2013.01)

(58) Field of Classification Search
CPC ...... A01F 15/07; A01F 15/10; A01F 15/0841; A01F 15/085; A01F 2015/077; A01F 15/106; A01B 69/004
See application file for complete search history.

(56) References Cited

U.S. PATENT DOCUMENTS

| 9,706,697 | B2 | 7/2017 | Wilkening et al. |
| 10,130,022 | B2 | 11/2018 | Blackwell et al. |
| 2019/0098833 | A1 * | 4/2019 | Kraus ............... A01F 15/02 |

FOREIGN PATENT DOCUMENTS

| EP | 3155890 A1 | 4/2017 | |
| EP | 3513646 A1 * | 7/2019 | ............ A01F 15/07 |
| KR | 20190041845 A | 4/2019 | |
| WO | 2005/53377 A2 | 6/2005 | |

* cited by examiner

*Primary Examiner* — Jimmy T Nguyen (74) *Attorney, Agent, or Firm* — Peter Zacharias (57) ABSTRACT

An agricultural baler includes: a chassis; a plurality of wheels carried by the chassis; at least one electric wheel motor coupled to at least one of the plurality of wheels and configured to drive the at least one coupled wheel; an apron assembly including a plurality of chains driven by a plurality of rolls and configured to form a bale, the plurality of rolls including a starter roll; an electric drive motor coupled to the starter roll and configured to drive the starter roll; and an electrical power system carried by the chassis and having at least one battery electrically coupled to the at least one electric wheel motor and the electric drive motor.

16 Claims, 5 Drawing Sheets

ELECTRICALLY DRIVEN AGRICULTURAL BALER

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, pickups of the baler gather the cut and windrowed crop material from the ground, then convey the cut crop material into a bale forming chamber within the baler. A drive mechanism operates to activate the pickups, augers, and a rotor of the feed mechanism. A conventional bale forming chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A knife or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

Known balers are typically large and towed by an agricultural tractor. Such an arrangement dedicates both the tractor and the baler to the task of baling. Since tractors are multi-functional vehicles, using the tractor to produce bales requires that the tractor is not used for a different task.

What is needed in the art is a baler that can address at least some of the previously described issues in the art.

SUMMARY OF THE INVENTION

Exemplary embodiments disclosed herein provide a baler that has electric motors and one or more batteries to perform functions of a baler without needing to be towed by a tractor or other vehicle.

In some exemplary embodiments provided according to the present disclosure, an agricultural baler includes: a chassis; a plurality of wheels carried by the chassis; at least one electric wheel motor coupled to at least one of the plurality of wheels and configured to drive the at least one coupled wheel; an apron assembly including a plurality of chains driven by a plurality of rolls and configured to form a bale, the plurality of rolls including a starter roll; an electric drive motor coupled to the starter roll and configured to drive the starter roll; and an electrical power system carried by the chassis and having at least one battery electrically coupled to the at least one electric wheel motor and the electric drive motor.

One possible advantage that may be realized by exemplary embodiments disclosed herein is that the baler can operate independently of a tractor or other vehicle, freeing up the tractor or other vehicle for a different use.

Another possible advantage that may be realized by exemplary embodiments disclosed herein is that the power loss due to mechanical coupling between the baler and a towing vehicle is avoided, which can increase power usage efficiency.

Yet another possible advantage that may be realized by exemplary embodiments disclosed herein is that the baler can be configured to automatically drive itself to an electric charging station when the one or more batteries are low on charge.

Yet another possible advantage that may be realized by exemplary embodiments disclosed herein is that operation of the baler can be started remotely without a user needing to be within close proximity to the baler.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
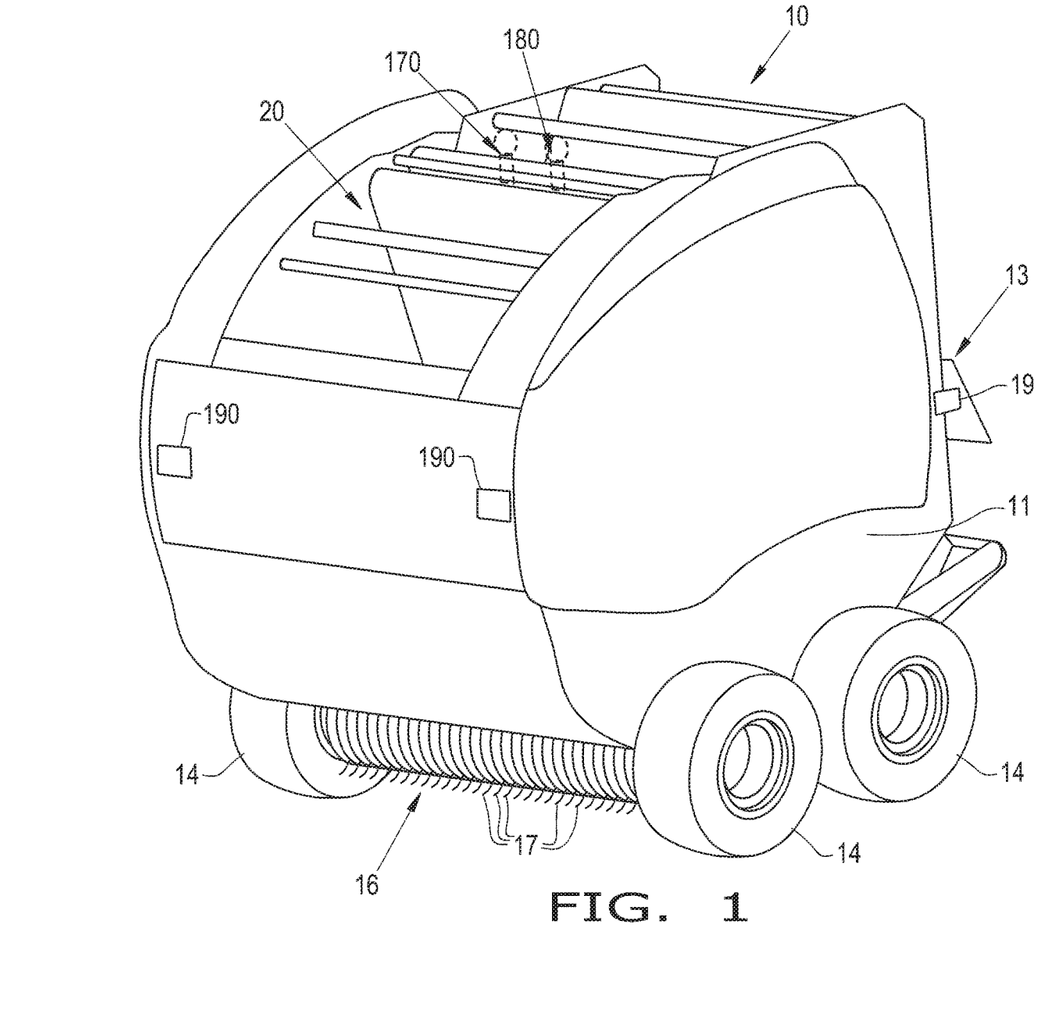
FIG. 1 illustrates a perspective, partial cut-away view of an exemplary embodiment of an agricultural baler, provided in accordance with the present disclosure.
Figure 2A:
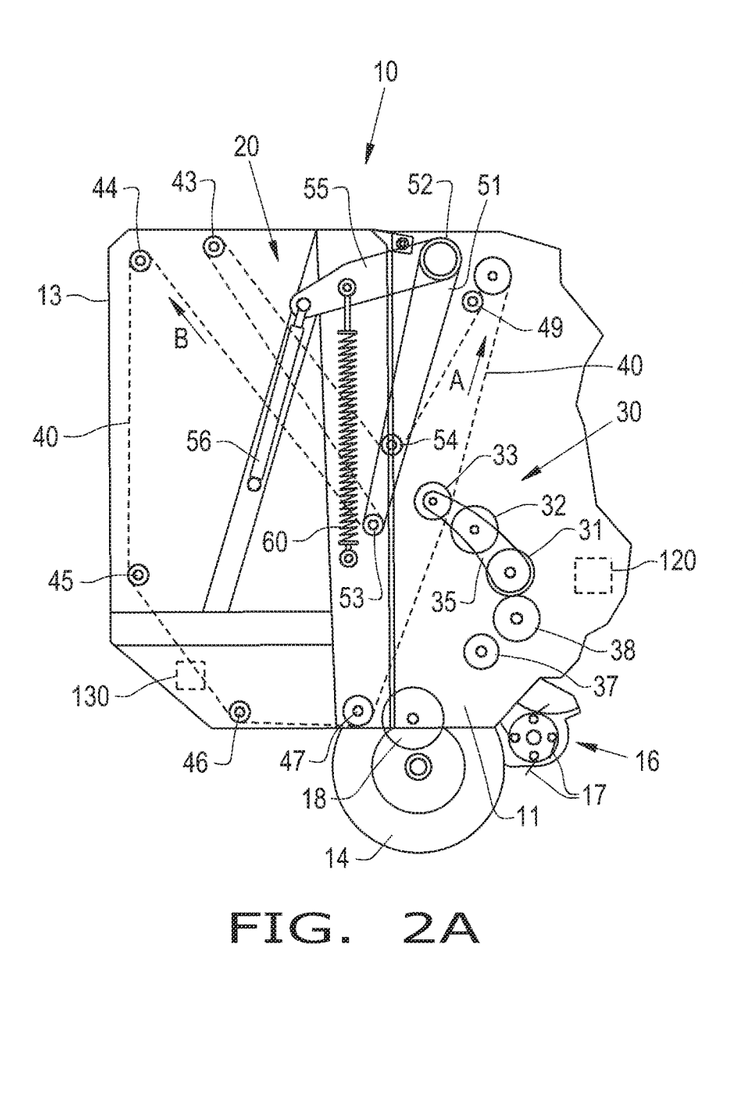
FIG. 2A illustrates a sectional view of the agricultural baler of FIG. 1 at a start of a bale formation cycle, provided in accordance with the present disclosure.
Figure 2B:
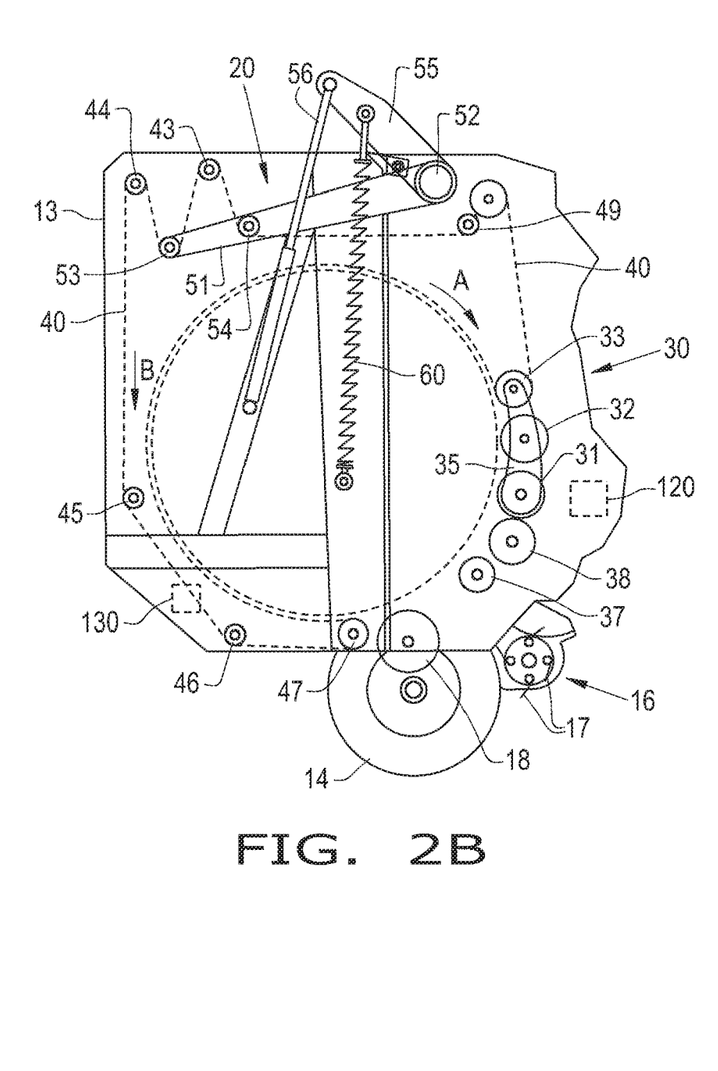
FIG. 2B illustrates a sectional view of the agricultural baler of FIGS. 1-2A at an end of the bale formation cycle.

Referring now to the drawings, and more particularly to FIGS. 1-2B, an exemplary embodiment of an agricultural baler 10 is illustrated that includes a chassis 11 supported by a plurality of wheels 14, illustrated as two pairs of wheels 14. While the baler 10 is illustrated and described as having two pairs of wheels 14, it should be appreciated that the baler 10 may include more than two pairs of wheels 14 to, for example, provide additional stability during bale release. Pivotally connected to the sides of the chassis 11 is a tailgate 13 that may be closed during bale formation or pivoted open by a tailgate actuator 19, which may also be referred to as a "bale release," to release a fully formed bale. A pickup 16, mounted on the chassis 11, includes a plurality of tines 17 movable in a predetermined path to lift crop material from the ground and deliver it rearwardly toward a rotatably mounted floor roll 18.

A bale forming chamber 20 for forming bales is defined partly by a sledge assembly 30 including a plurality of rollers 31, 32 extending transversely in the arcuate arrangement shown in FIGS. 2A and 2B. Rollers 31, 32 are journalled at their ends in a pair of spaced apart arms 35, one of which is shown. These arms are pivotally mounted inside the chassis 11 on stub shafts for providing movement of sledge assembly 30 between the bale starting position shown in FIG. 2A and the full bale position shown in FIG. 2B. Rollers 31, 32 are driven in a counter-clockwise direction by, e.g., chains and sprockets or gears, connected to and powered by a power source, as will be described further herein. A freely rotatable idler roller 33 is also carried by arms 35. Additionally, a starter roll 37, and a fixed roll 38 are located adjacent to roller 31, and are also driven in a counterclockwise direction.

The bale forming chamber 20 is further defined by an apron assembly 40 including a plurality of continuous side-by-side chains, which also may be referred to as belts, supported by guide rolls 43, 44, 45, 46, 47 rotatably mounted in tailgate 13. Apron assembly 40 passes between roller 32 on sledge assembly 30 and idler roller 33, and is in engagement only with idler roller 33 and not roller 32 which is located in close proximity to the apron chains to strip crop material from the chains, in addition to its bale forming function. Starter roll 37 is powered via coupling to a power source, as will be described further herein, and a drive train which moves apron assembly 40 along its changing path, indicated generally by arrows A and B in FIGS. 2A and 2B. An additional guide roll 49 ensures proper driving engagement between apron assembly 40 and starter roll 37. It should be appreciated that while the baler 10 is illustrated and described in the embodiment of a variable chamber baler, the baler 10 can also be provided as a fixed baler assembly without deviating from the present disclosure.

A pair of take up arms 51 (only one shown) are mounted to pivot conjointly with a cross shaft 52 between inner and outer positions, shown in FIGS. 2A and 2B, respectively, and carry additional guide rolls 53, 54 for supporting apron assembly 40. Chain tension lever arm 55 is also affixed to shaft 52 to pivot with take up arms 51. A return spring 60 is secured between the chassis 11 and tension lever arm 55 to bias the shaft 52 and take up arms 51 toward the bale starting position (shown in FIG. 2A) and move the take up arms toward the bale starting position following release of a completed bale. An apron tensioning system, which may include an electric bale tension actuator 56, is mounted between tailgate 13 and take up arms 51 and configured to resist movement of the take up arms 51 from the bale starting position (FIG. 2A) toward the full bale position (FIG. 2B).

Known agricultural balers couple to a towing vehicle, such as a tractor, with mechanical, electrical, and hydraulic connections to provide mechanical, electrical, and hydraulic power for various functions of the baler. While this is effective to operate the baler, it leashes operation of the baler to the towing vehicle. The inability to operate the baler without the towing vehicle thus requires that the towing vehicle, which is usually a multi-functional vehicle, also be used during a baling operation. Further, it has been discovered that mechanical power usage by the baler results in a significant power loss. In some cases, mechanical power usage by the baler may be only 85-90% efficient, compared to the input mechanical power from the towing vehicle, due to the coupling to the towing vehicle as well as mechanical couplings in the baler, such as the use of chains and sprockets. This lowered power efficiency results in a considerable amount of energy being wasted solely due to mechanical losses within the baler.

Figure 3:
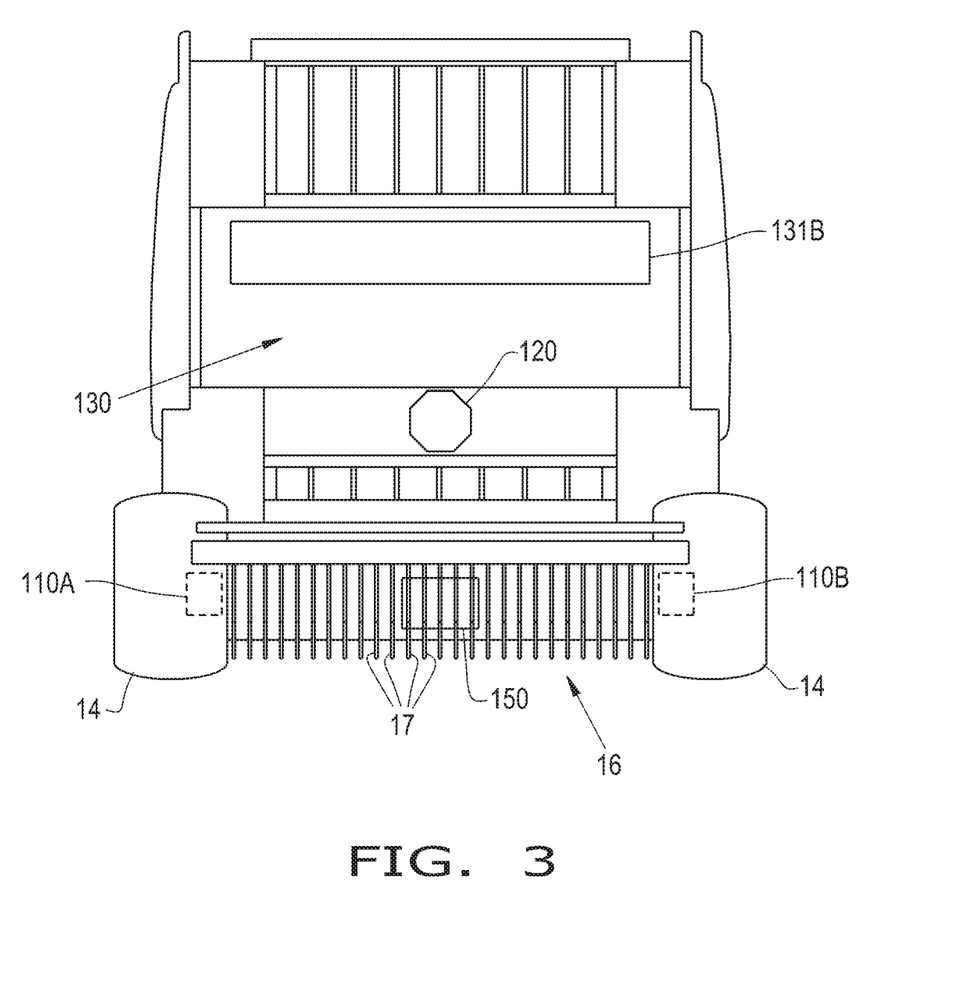
FIG. 3 illustrates a sectional front view of the agricultural baler of FIGS. 1-2B.
Figure 4:
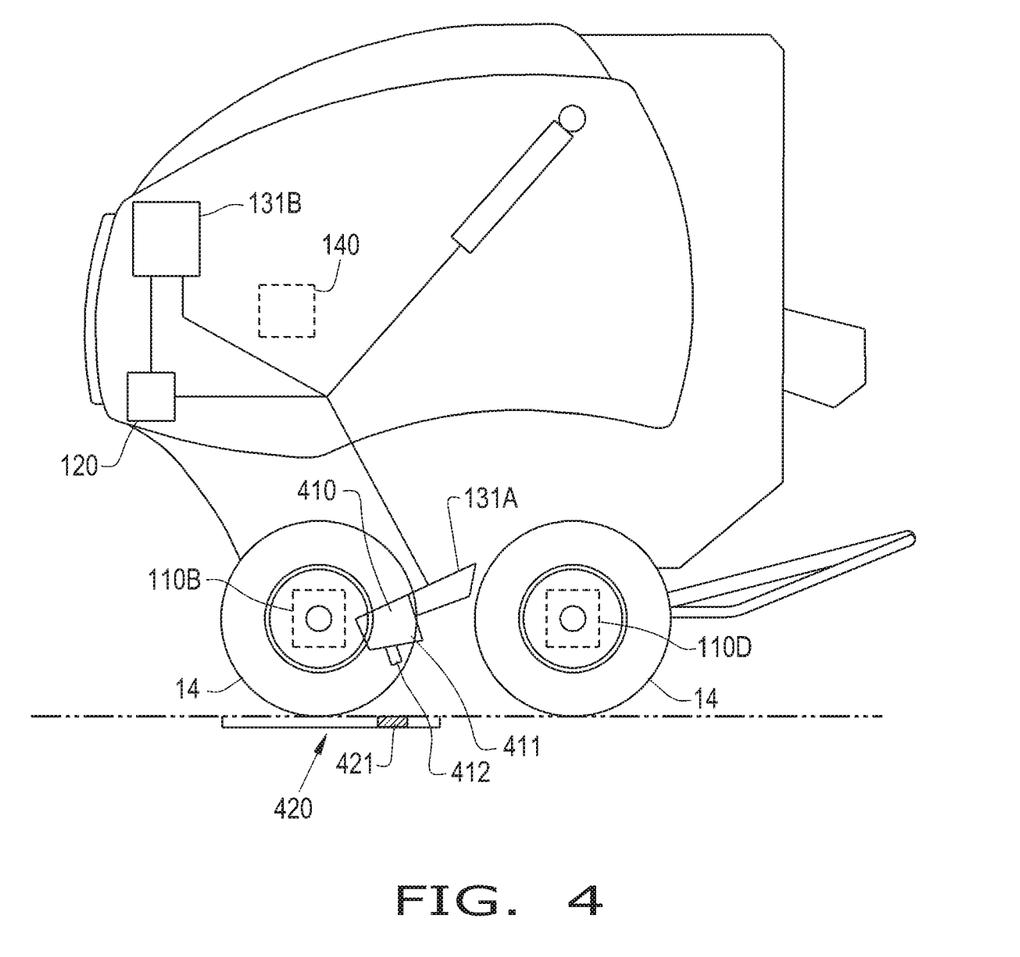
FIG. 4 illustrates a sectional side view of the agricultural baler of FIGS. 1-3.
Figure 5:
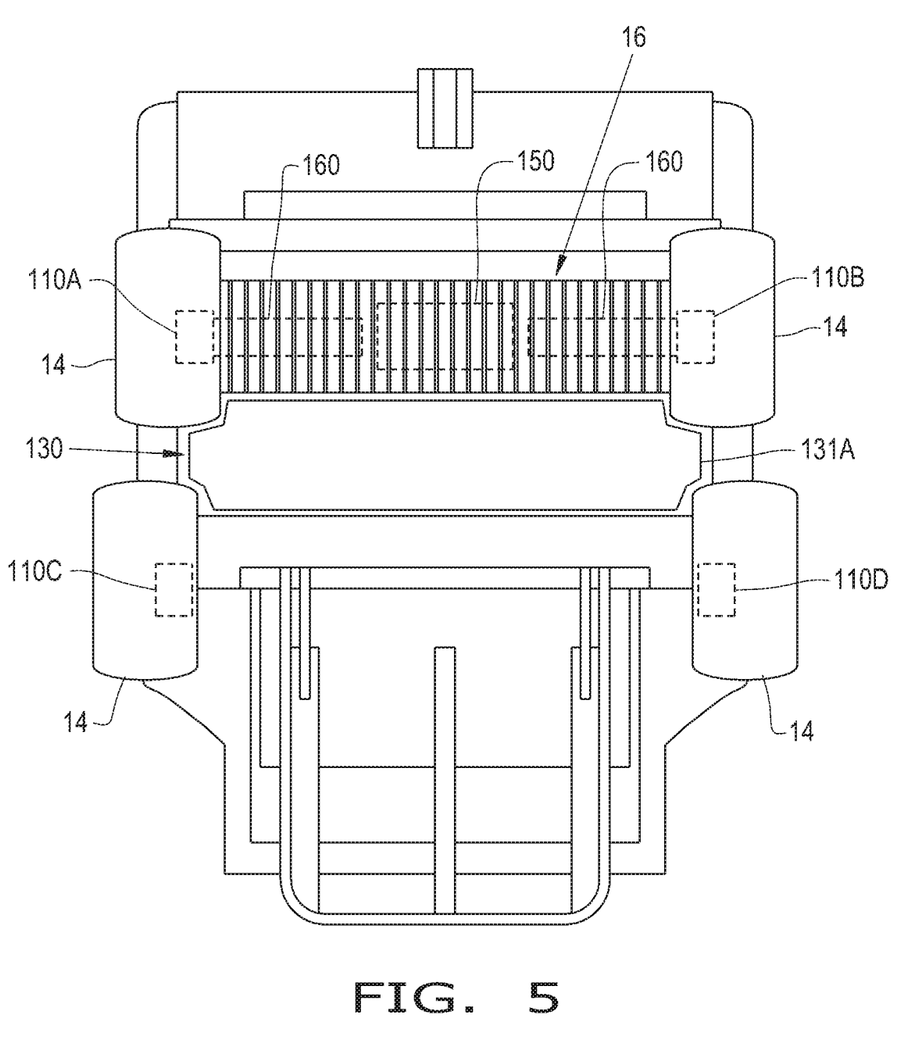
FIG. 5 illustrates a sectional bottom view of the agricultural baler of FIGS. 1-4.

To address some of the previously described issues, and referring still to FIGS. 1-2B as well as FIGS. 3-5, the agricultural baler 10 provided according to the present disclosure includes least one electric wheel motor, illustrated as four electric wheel motors 110A, 110B, 110C, 110D, coupled to the wheels 14 and an electric drive motor 120 coupled to the starter roll 37. Each of the electric wheel motors 110A, 110B, 110C, 110D drives a respectively coupled wheel 14 to propel the baler 10 and the electric drive motor 120 drives the starter roll 37 to rotate the chains and form the bale within the bale forming chamber 20. To power the motors 110A, 110B, 110C, 110D, 120, the baler 10 also includes an electrical power system 130 that includes one or more batteries 131A, 131B electrically coupled to the motors 110A, 110B, 110C, 110D, 120 and, in some embodiments, other electrically powered components of the baler 10. It should be appreciated that, as used herein, a "battery" may refer to a unit with a single electrochemical cell or a unit with multiple electrochemical cells, which is often referred to as a "battery pack." While the electrical power system 130 is illustrated and described as having multiple batteries 131A, 131B, in some embodiments the electrical power system 130 has a single, central battery. The batteries 131A, 131B may be rechargeable batteries that can be recharged when coupled to a recharging station, as will be described further herein. In some embodiments, such as the illustrated embodiment, the baler 10 lacks a mechanical coupling configured to couple the baler 10 to a towing vehicle, allowing the baler 10 to operate as an independent, self-propelled vehicle that is electrically powered by the batteries 131A, 131B.

In some embodiments, such as the illustrated embodiment, each of the wheels 14 is coupled to a respective electric wheel motor 110A, 110B, 110C, 110D so the baler 10 has what is known as an "all-wheel drive" propulsion system. Each electric wheel motor 110A, 110B, 110C, 110D may have a power output of, for example, 18 hp to 30 hp and produce 90 N*m to 120 N*m of torque, for a total output of 70 hp to 120 hp and total torque production of 360 N*m to 480 N*m. Electric motors are well-suited for propelling the baler 10 because electric motors tend to have high, near-instantaneous torque production. This type of torque production is useful for operating balers because balers frequently stop to release a formed bale before continuing to travel forward; the high, near-instantaneous torque productions assists in propelling the baler forward from a stop. Each of the electric wheel motors 110A, 110B, 110C, 110D may electrically couple to a common wheel drive battery 131A of the electrical power system 130 for the electrical power needed to drive the wheels 14. The wheel drive battery 131A may be provided with a variable amount of power holding capacity, which is generally rated in kilowatt hours (kWh), depending on the size and power requirements of the baler 10. In some embodiments, the wheel drive battery 131A has a power holding capacity of between 500 and 1,500 kWh and may be, for example, a lithium-ion or lead-acid battery. As illustrated in FIG. 4, the wheel drive battery 131A may be carried by the chassis 11 at a relatively low point so the wheel drive battery 131A is held close to the ground. Holding the wheel drive battery 131A close to the ground can improve handling characteristics of the baler 10 and also make it easier to recharge the wheel drive battery 131A, as will be described further herein. It should be appreciated that while only one wheel drive battery 131A is illustrated and described, multiple wheel drive batteries may be provided according to the present disclosure to power the electric wheel motors 110A, 110B, 110C, 110D.

The baler 10 may further include a controller 140 that is operably coupled to each of the electric wheel motors 110A, 110B, 110C, 110D and configured to control operation of the electric wheel motors 110A, 110B, 110C, 110D and thus propulsion of the baler 10. For example, the controller 140 may be configured to control power output and torque of the electric wheel motors 110A, 110B, 110C, 110D and adjust the output and torque responsively to different field conditions, as is known. The controller 140 may be a general controller that controls the function of multiple baler components, as will be described further herein, or a specific controller that is configured only to control propulsion of the baler 10. Each of the electric wheel motors 110A, 110B, 110C, 110D may be identical or, alternatively, the front electric wheels motors 110A, 110B and the rear electric wheel motors 110C, 110D may have different configurations to generate, for example, different values of torque. It should be appreciated that many suitable electric wheel motors are known, so further description is omitted for brevity.

The electric drive motor 120 is coupled to the starter roll 37 to rotate the starter roll 37, which allows formation of bales in the bale forming chamber 20. The electric drive motor 120 may electrically couple to one or more drive batteries 131B of the electrical power system 130 to draw the electrical power needed for operation. The one or more drive batteries 131B may, for example, be one or more batteries that is separate from the wheel drive battery 131A and provides electrical power to all other components of the baler 10. The power holding capacity of the one or more drive batteries 131B may be, for example, between 200 kWh and 800 kWh. The electric drive motor 120 may drive a drive shaft that couples to the starter roll 37 or, alternatively, may couple directly to the starter roll 37. The controller 140 may be operatively coupled to the electric drive motor 120 and be configured to control the operation of the electric drive motor 120. For example, the controller 140 may be configured to output drive start signals to the electric drive motor 120 to begin a bale forming cycle so the electric drive motor 120 drives the starter roll 37 to form a bale in the bale forming chamber 20. After the controller 140 determines that the bale is formed and ready to be wrapped, the controller 140 may output a drive stop signal to the electric drive motor 120 to stop the electric drive motor 120, which stops driving of the starter roll 37, until a new bale forming cycle begins. The controller 140 may also be configured to output various drive signals to the electric drive motor 120 to, for example, increase or decrease the power output of the electric drive motor 120. For example, the controller 140 may be configured to output a power output increase signal to the electric drive motor 120 to increase the power output of the electric drive motor 120 as the size of the bale increases. It should thus be appreciated that the controller 140 may control the electric drive motor 120 in a variety of ways according to the present disclosure.

In some embodiments, the tailgate actuator 19 that pivots the tailgate 13 is an electric actuator that is electrically coupled to one of the batteries, such as the drive battery 131B. The baler 10 including an electric tailgate actuator 19 is in contrast to known balers, which have tailgates that are opened and closed by hydraulic cylinders. The hydraulic tailgate cylinder of known balers requires a hydraulic connection to the towing vehicle for pressurized fluid, as well as plumbing to deliver the pressurized fluid to the hydraulic cylinder. By using an electric tailgate actuator 19, rather than a hydraulic cylinder, the baler 10 provided according to the present disclosure can be produced without a hydraulic coupling and associated hydraulic fluid lines. Further, the electric tailgate actuator 19 can be directly controlled by, for example, an operative coupling to the controller 140, rather than by controlling the supply of hydraulic fluid to a hydraulic cylinder.

The pickup 16, which rotates to feed crop material toward the bale forming chamber 20, may also be electrically driven. In some embodiments, the pickup 16 is coupled to the electric drive motor 120 by, for example, a drive shaft, with rotation of the electric drive motor 120 driving rotation of the pickup 16. Alternatively, the pickup 16 may be coupled to an electric pickup motor 150 that is electrically coupled to one of the batteries, such as the electric drive battery 131B. When a separate electric pickup motor 150 drives the pickup 16, the electric pickup motor 150 may be operatively coupled to the controller 140 so the controller 140 may control a rotational speed of the pickup motor 150, and thus the rotational speed of the pickup 16.

It should be appreciated that other systems of the baler 10, such as the wrapping system, may also be electrically driven. Thus, the baler 10 provided according to the present disclosure can be a fully electric vehicle that does not require hydraulics or other types of power generating devices. Such a configuration can simplify the construction of the baler 10 by reducing the number of different systems that must be incorporated in the baler 10, compared to known balers.

In some embodiments, and referring now to FIG. 4, the baler 10 may include an induction charging system 410 that is electrically coupled to at least one of the batteries 131A, 131B. In some embodiments, the induction charging system 410 is electrically coupled to all of the batteries 131A, 131B of the electrical power system 130 so the induction charging system 410 is able to provide power to and recharge all of the batteries 131A, 131B. The induction charging system 410 includes an induction coil 411 that may be, for example, 100 mm to 200 mm from the ground. When the induction coil 411 is in close proximity with a charging station 420, the charging station 420 can wirelessly transmit power to the induction coil 411, which is then distributed to the batteries 131A, 131B of the electrical power system 130. The charging station 420 may be, for example, in the form of an induction charging pad. In some embodiments, the induction charging system 410 includes an induction transceiver 412 that is operatively coupled to the controller 140. The controller 140 can output a charge signal to the induction transceiver 412, which then transmits a corresponding signal to a corresponding transceiver 421 of the charging station 420 to begin wireless power transmission from the charging station 420 to the induction coil 411. In some embodiments, the induction charging system 410 is configured to accept at least 200 kW of charge, such as at least 300 kW, to rapidly recharge the batteries 131A, 131B. Such induction charging systems are known, so further description is omitted for brevity.

In some embodiments, the baler 10 includes a steering device 160 that is coupled to one or more of the wheels 14, such as the front wheels, and electrically coupled to the controller 140. The steering device 160 is configured to change a steering angle of the coupled wheel(s) 14 in order to steer the baler 10, as is generally known. The controller 140 may be configured to output steering signal to the steering device 160 to steer the baler 10 along a route under the control of the controller 140, as is known. To assist in guiding the baler 10, the baler 10 may include a global positioning satellite (GPS) transceiver 170 that is operatively coupled to the controller 140, with the controller 140 utilizing signals from the GPS transceiver 170 to determine how to control steering of the baler 10. Such arrangements are known and used in both autonomous and semi-autonomous vehicles, so further description is omitted for brevity.

As previously described, the controller 140 may be configured to output drive start signals to the electric drive motor 120 to begin a bale forming cycle. The controller 140 may be configured, for example, to output a drive start signal to the electric drive motor 120 after determining that a formed bale has been released from the baler 10. To initially start the baler 10, the controller 140 may be configured to receive a remote start signal and begin a bale forming cycle responsively to receiving the remote start signal. The remote start signal may originate, for example, from a remote device, such as a cellular phone, computer, or similar device. To receive the remote start signal, the baler 10 may include a communication transceiver 180, which may be incorporated in or distinct from the GPS transceiver 170, that is operatively coupled to the controller 140. The controller 140 may be configured to output the drive start signal to the electric drive motor 120 responsively to receiving the remote start signal. Similarly, the controller 140 may be configured to receive a remote stop signal and end an ongoing bale forming cycle responsively to receiving the remote signal, e.g., by outputting the drive stop signal to the electric drive motor 120. The controller 140 may also output a stop signal responsively to, for example, receiving an empty material roll signal that corresponds to all of the wrapping material of a roll of wrapping material being consumed, which requires replacement of the roll. In some embodiments, the controller 140 is also configured to output start and stop signals to the wheel drive motors 110A, 110B, 110C, 110D responsively to receiving the remote start signal and the remote stop signal, respectively, to start and stop propulsion of the baler 10. Thus, it should be appreciated that the controller 140 may be configured to accept commands from a remote device to control baling by the baler 10.

In some embodiments, the controller 140 is electrically coupled to at least one of the batteries 131A, 131B and configured to determine at least one of the batteries 131A, 131B is in a low charge state. As used herein, a "low charge state" may correspond to when the battery 131A, 131B has an energy level that has fallen below a defined threshold, such as 10% of maximum capacity. After determining that one or more of the batteries 131A, 131B is in the low charge state, the controller 140 may output steering signals to the steering device 160 to steer the baler 10 toward a charging station, such as the previously described induction charging station 420. The controller 140 may, for example, be configured to utilize GPS signals to determine a current location of the baler 10. Based on the current location of the baler 10, and a known location of the charging station 420, the controller 140 may determine a steering path that takes the baler 10 to the charging station 420 and output steering signals to the steering device 160 to follow the steering path so the baler 10 travels to the charging station 420. The controller 140 may also be configured to reduce the power consumption by the electric drive motor 120 (or other electrically driven components) when the batteries 131A, 131B are in the low charge state, such as by outputting a stop signal when the controller 140 determines that one or more of the batteries 131A, 131B is in the low charge state.

In some embodiments, the baler 10 may include one or more optical sensors 190 that are operatively coupled to the controller 140 and configured to assist the controller 140 in identifying the charging station 420 once the baler 10 is in close proximity to the charging station 420. Upon determining the baler 10 is in close proximity to the charging station 420 using, for example, optical recognition of images captured by the optical sensor(s) 190, the controller 140 may output steering signals to the steering device 160 to guide the baler 10 to a location where the induction coil 411 of the induction charging system 410 is close enough to the charging station 420 for wireless power transmission to occur. It should thus be appreciated that the controller 140 may be configured to utilize GPS to get the baler relatively close to the charging station 420, but then use a second type of guidance to more accurately steer the baler 10 to the charging station 420 for charging.

From the foregoing, it should be appreciated that the baler 10 provided according to the present disclosure is an electrically powered baler that can operate without being towed by a vehicle. The baler 10 may be independent and carry its own electric power source to operate autonomously. When the batteries 131A, 131B of the baler 10 are low on charge, the baler 10 may drive back to a charging station 420 to recharge the batteries 131A, 131B, allowing the baler 10 to continuously operate and recharge without user intervention. The baler 10 may also be activated by a remote device to allow a user to conveniently start the baling operation without being in close proximity to the baler 10. Further, the baler 10 being electrically driven eliminates a large amount of power loss that occurs due to mechanical losses in a PTO shaft and transmission so the baler 10 is relatively energy efficient. This efficiency allows the baler 10 to operate using less energy than known balers that are towed Eliminating the need for a towing vehicle also reduces the total amount of weight that must be propelled forward to perform the baling operation, further reducing the amount of energy needed to perform the baling operation. It should thus be appreciated that the baler 10 provided according to the present disclosure can eliminate the need to use two different vehicles for a baling operation while also increasing the energy efficiency of the baling operation.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:
1. An agricultural baler, comprising:
a chassis;
a plurality of pairs of wheels carried by the chassis;
at least one electric wheel motor coupled to at least one wheel of the plurality of pairs of wheels and configured to drive the at least one wheel of the plurality of pairs of wheels;
an apron assembly comprising a plurality of chains driven by a plurality of rolls and configured to form a bale in a bale forming chamber, one of the plurality of rolls comprising a starter roll;
at least one take up arm pivotally mounted within the bale forming chamber to support the apron assembly;
a chain tension lever arm pivotally coupled to the at least one take up arm;
an electric drive motor coupled to the starter roll and configured to drive the starter roll; and
an electrical power system carried by the chassis and comprising at least one battery electrically coupled to the at least one electric wheel motor and the electric drive motor.
2. The baler of claim 1, further comprising a tailgate pivotably carried by the chassis and a tailgate actuator coupled to the tailgate and electrically coupled to the at least one battery, the tailgate actuator being configured to activate and pivot the tailgate relative to the chassis.

3. The baler of claim 1, further comprising a pickup comprising a plurality of tines and coupled to the electric drive motor or an electric pickup motor electrically coupled to the at least one battery.

4. The baler of claim 1, wherein the at least one battery comprises a plurality of batteries.

5. The baler of claim 4, wherein the plurality of batteries comprise at least one wheel drive battery electrically coupled to the at least one electric wheel motor and at least one drive battery electrically coupled to the electric drive motor.

6. The baler of claim 1, further comprising an induction charging system electrically coupled to the at least one battery, the induction charging system being configured to provide electrical power to the at least one battery to recharge the at least one battery.

7. The baler of claim 1, further comprising a controller operatively coupled to the electric drive motor, the controller being configured to output drive start signals to the electric drive motor to begin a bale forming cycle.

8. The baler of claim 7, wherein the controller is further configured to receive a remote start signal and begin a bale forming cycle responsively to receiving the remote start signal.

9. The baler of claim 8, wherein the controller is further configured to receive a remote stop signal and end an ongoing bale forming cycle responsively to receiving the remote stop signal.

10. The baler of claim 7, further comprising a steering device coupled to at least one of the wheels and electrically coupled to the controller, the controller being further configured to output steering signals to the steering device to steer the baler.

11. The baler of claim 10, wherein the controller is electrically coupled to the at least one battery and further configured to:
  determine the at least one battery is in a low charge state; and
  output steering signals to the steering device to steer the baler toward a charging station.

12. The baler of claim 11, further comprising an induction charging system electrically coupled to the at least one battery, the induction charging system being configured to provide electrical power to the at least one battery to recharge the at least one battery.

13. The baler of claim 11, wherein the output steering signals cause the steering device to steer the baler toward the charging station.

14. The baler of claim 7, wherein the controller is electrically coupled to the at least one battery and further configured to:
  determine the at least one battery is in a low charge state; and
  output a stop signal to the electric drive motor responsively to determining the at least one battery is in the low charge state.

15. The baler of claim 1, wherein the at least one electric wheel motor comprises a plurality of electric wheel motors.

16. The baler of claim 15, wherein each of the electric wheel motors is coupled to a respective one of the plurality of pairs of wheels.

* * * * *